US009301158B2

(12) United States Patent
Zhou et al.

(10) Patent No.: US 9,301,158 B2
(45) Date of Patent: Mar. 29, 2016

(54) SYSTEMS AND METHODS FOR OPTIMIZATION OF BRANCH SYNCHRONIZATION NODE DETERMINATION IN A PEER-TO-PEER NETWORK

(71) Applicant: Qualcomm Incorporated, San Diego, CA (US)

(72) Inventors: Yan Zhou, San Diego, CA (US); Santosh Paul Abraham, San Diego, CA (US); George Cherian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 91 days.

(21) Appl. No.: 13/789,450

(22) Filed: Mar. 7, 2013

(65) Prior Publication Data

US 2014/0153421 A1 Jun. 5, 2014

Related U.S. Application Data

(60) Provisional application No. 61/732,079, filed on Nov. 30, 2012.

(51) Int. Cl.
*H04L 12/26* (2006.01)
*H04W 24/02* (2009.01)
(Continued)

(52) U.S. Cl.
CPC .............. *H04W 24/02* (2013.01); *H04W 56/00* (2013.01); *H04W 56/0015* (2013.01); *H04W 84/20* (2013.01); *H04W 84/12* (2013.01); *H04W 84/18* (2013.01); *Y02B 60/50* (2013.01)

(58) Field of Classification Search
CPC ............ H04W 56/0015; H04W 56/00; H04W 56/001; H04W 8/005; H04W 24/02; H04W 48/18
USPC .......................................... 370/350, 338, 252
See application file for complete search history.

(56) References Cited

U.S. PATENT DOCUMENTS 5,732,077 A * 3/1998 Whitehead .......... H04W 52/286
370/349
7,468,969 B2 * 12/2008 Zuniga .......................... 370/338

(Continued)

OTHER PUBLICATIONS

"Bluetooth Specification Version 1.0 B, Core," Bluetooth Specification Version, XX, XX, vol. 1, Dec. 1, 1999, pp. 95-126, XP002174708.

(Continued)

*Primary Examiner* — Dang Ton
*Assistant Examiner* — Abdeltif Ajid
(74) *Attorney, Agent, or Firm* — S. Hossain Beladi

(57) ABSTRACT

Methods, devices, and computer program products for optimization of branch synchronization node determination in a peer-to-peer network are disclosed herein. In one aspect, a higher-level node, such as a root node broadcasting master clock synchronization messages to other devices, may determine a dynamic signal strength threshold and send it in those synchronization messages. This dynamic threshold may be determined to ensure that at least a certain percentage of receiving nodes are potential branch nodes, based on the received signal strengths of those nodes at the root node. This method can reduce device energy consumption by only requiring edge devices to relay the synchronization messages, and they can be dynamically identified based on the threshold. In addition, a branch node can also use the dynamic signal strength threshold to help the determination of its potential next-hop branch nodes.

25 Claims, 6 Drawing Sheets

(51) Int. Cl.
  *H04W 84/20* (2009.01)
  *H04W 56/00* (2009.01)
  *H04W 84/12* (2009.01)
  *H04W 84/18* (2009.01)

(56) References Cited

U.S. PATENT DOCUMENTS

| | | | |
|---|---|---|---|
| 7,656,804 B2* | 2/2010 | Shi | H04L 29/12009 370/238 |
| 8,340,572 B2 | 12/2012 | Duffy et al. | |
| 2011/0110521 A1 | 5/2011 | Yang et al. | |
| 2011/0222515 A1* | 9/2011 | Wang | H04W 84/20 370/338 |
| 2012/0020237 A1 | 1/2012 | Tanaka et al. | |
| 2013/0132501 A1* | 5/2013 | Vandwalle et al. | 709/208 |

OTHER PUBLICATIONS

International Search Report and Written Opinion—PCT/US2013/070822—ISAEPO—Apr. 3, 2014.

Dilum Bandara, H. M. N., Jayasumana, A. P., & Illangasekare, T. H. (Mar. 2011). A top-down clustering and cluster-tree-based routing scheme for wireless sensor networks. International Journal of Distributed Sensor Networks. doi:10.1155/2011/940751.

* cited by examiner

SYSTEMS AND METHODS FOR OPTIMIZATION OF BRANCH SYNCHRONIZATION NODE DETERMINATION IN A PEER-TO-PEER NETWORK

CLAIM OF PRIORITY UNDER 35 U.S.C. §119

The present Application for Patent claims priority to Provisional Application No. 61/732,079 entitled "SYSTEMS AND METHODS FOR OPTIMIZATION OF BRANCH SYNCHRONIZATION NODE DETERMINATION IN A PEER-TO-PEER NETWORK " filed Nov. 30, 2012, and assigned to the assignee hereof and hereby expressly incorporated by reference herein.

BACKGROUND

1. Field

The present application relates generally to wireless communications, and more specifically to systems, methods, and devices for optimization of branch node determination in a in a peer-to-peer wireless network.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit and/or receive information to and from each other. To carry out various communications, the devices may need to coordinate according to a protocol. As such, devices may exchange information to coordinate their activities Improved systems, methods, and devices for coordinating transmitting and sending communications within a wireless network are desired.

FIG. 1a illustrates an example of a prior art wireless communication system 100. The wireless communication system 100 may operate pursuant to a wireless standard, such as an 802.11 standard. The wireless communication system 100 may include an AP 104, which communicates with STAs. In some aspects, the wireless communication system 100 may include more than one AP. Additionally, the STAs may communicate with other STAs. As an example, a first STA 106a may communicate with a second STA 106b. As another example, a first STA 106a may communicate with a third STA 106c although this communication link is not illustrated in FIG. 1a.

A variety of processes and methods may be used for transmissions in the wireless communication system 100 between the AP 104 and the STAs and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs and between an individual STA, such as the first STA 106a, and another individual STA, such as the second STA 106b, in accordance with CDMA techniques. If this is the case, the wireless communication system 100 may be referred to as a CDMA system.

A communication link may be established between STAs. Some possible communication links between STAs are illustrated in FIG. 1a. As an example, a communication link 112 may facilitate transmission from the first STA 106a to the second STA 106b. Another communication link 112 may facilitate transmission from the second STA 106b to the first STA 106a.

The AP 104 may act as a base station and provide wireless communication coverage in a basic service area (BSA) 102. The AP 104 along with the STAs associated with the AP 104 and that use the AP 104 for communication may be referred to as a basic service set (BSS).

It should be noted that the wireless communication system 100 may not have a central AP 104, but rather may function as a peer-to-peer network between the STAs. Accordingly, the functions of the AP 104 described herein may alternatively be performed by one or more of the STAs.

FIG. 1b illustrates an example of a prior art wireless communication system 160 that may function as a peer-to-peer network. For example, the wireless communication system 160 shown in FIG. 1b shows STAs 106a-i that may communicate with each other without the presence of an AP. As such, the STAs, 106a-i may be configured to communicate in different ways to coordinate transmission and reception of messages to prevent interference and accomplish various tasks. In one aspect, the networks shown in FIG. 1b may configured as a "near-me are network" (NAN). In one aspect, a NAN may refer to a network for communication between STAs that are located in close proximity to each other. In some cases the STAs operating within the NAN may belong to different network structures (e.g., STAs in different homes or buildings as part of independent LANs with different external network connections).

In some aspects, a communication protocol used for communication between nodes on the peer to peer communications network 160 may schedule periods of time during which communication between network nodes may occur. These periods of time when communication occurs between STAs a-i may be known as availability windows. An availability window may include a discovery interval or paging interval as discussed further below.

The protocol may also define other periods of time when no communication between nodes of the network is to occur. In some embodiments, nodes may enter one or more sleep states when the peer to peer network 160 is not in an availability window. Alternatively, in some embodiments, portions of the stations 106a-i may enter a sleep state when the peer to peer network is not in an availability window. For example, some stations may include networking hardware that enters a sleep state when the peer to peer network is not in an availability window, while other hardware included in the STA, for example, a processor, an electronic display, or the like do not enter a sleep state when the peer to peer network is not in an availability window.

The peer to peer communication network 160 may assign one node to be a root node. In FIG. 1b, the assigned root node is shown as STA 106e. In peer to peer network 160, the root node is responsible for periodically transmitting synchronization signals to other nodes in the peer to peer network. The synchronization signals transmitted by root node 160e may provide a timing reference for other nodes 106a-d and 106f-i to coordinate an availability window during which communication occurs between the nodes. For example, a synchronization message 172a-d may be transmitted by root node 106e and received by nodes 106b-c and 106f-g. The synchronization message 172 may provide a timing source for the STAs 106b-c and 106f-g. The synchronization message 172 may also provide updates to a schedule for future availability windows. The synchronization messages 172 may also function to notify STAs 106b-c and 106f-g that they are still present in the peer to peer network 160.

Some of the nodes in the peer to peer communication network 160 may function as branch synchronization nodes. A branch synchronization node may retransmit both availability window schedule and master clock information received from a root node. In some embodiments, synchronization messages transmitted by a root node may include availability window schedule and master clock information. In these embodiments, the synchronization messages may be retransmitted by the branch synchronization nodes. In FIG. 1b, STAs 106b-c and 106f-g are shown functioning as branch-synchronization nodes in the peer to peer communication network 160. STAs 106b-c and 106f-g receive the synchronization message 172a-d from root node 106e and retransmit the synchronization message as retransmitted synchronization messages 174a-d. By retransmitting the synchronization message 172 from root node 106e, the branch synchronization nodes 106b-c and 106f-g may extend the range and improve the robustness of the peer to peer network 160.

The retransmitted synchronization messages 174a-d are received by nodes 106a, 106d, 106h, and 106i. These nodes may be characterized as "leaf" nodes, in that they do not retransmit the synchronization message they receive from either the root node 106e or the branch synchronization nodes 106b-c or 106f-g.

The selection of branch synchronization nodes may be important. These nodes may be responsible for re-transmitting the synchronization messages from the root node, and may thus allow the network to be larger and enable communication between a larger number of devices. If too many nodes are selected as branch synchronization nodes, this may result in unnecessary network traffic. Conversely, if too few nodes are selected as branch synchronization nodes, this may result in many devices being unable to connect to the network. In the prior art, a device may consider itself as a branch synchronization node candidate if a received signal strength (RSSI) from the root is below some fixed threshold. This may allow devices are near the root, and above the RSSI threshold, to not be chosen as branch synchronization nodes, as these devices may not be able to extend the reach of the network very far, given their proximity to the root device. However, this approach may be problematic if there are few or no nodes capable of receiving messages from the root device but with an RSSI below the RSSI threshold.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a device in an ad hoc wireless communication network configured to generate a dynamic signal strength threshold, the device comprising a receiver configured to receive messages from other devices in the wireless communication network; a processor configured to determine a signal strength of the messages from the respective other devices and to identify a signal strength threshold to be used to determine a branch device; and a transmitter to be configured to transmit the signal strength threshold to the other devices in the wireless communication network.

In one aspect, a method for determining a signal strength threshold in an ad-hoc wireless communications network is disclosed, the method comprising receiving messages from other devices in the wireless communication network; determining the signal strengths of the respective other devices in the wireless communication network, based at least in part on the received messages from other devices in the wireless communication network; identifying a signal strength threshold to be used to determine a branch device; and transmitting a signal strength threshold to other devices in the wireless communication network.

In one aspect, a non-transitory, computer readable medium comprising instructions that when executed cause a processor in a device to perform a method for determining a signal strength threshold in a ad-hoc wireless communications network is disclosed, the method comprising: receiving messages from other devices in the wireless communication network; determining the signal strengths of the respective other devices in the wireless communication network, based at least in part on the received messages from other devices in the wireless communication network; indentifying a signal strength threshold to be used to determine a branch device; and transmitting a signal strength threshold to other devices in the wireless communication network.

One aspect of the disclosure provides a device in an ad hoc wireless communication network configured to receive a dynamic signal strength threshold, the device comprising a receiver configured to receive messages from one or more other devices in the wireless communication network containing a dynamic signal strength threshold; and a processor configured to compare the dynamic signal strength threshold received in the messages to a signal strength of the messages, and further configured to determine whether the device may be a potential branch node based at least on the comparison of the dynamic signal strength threshold to the signal strength of the messages.

In one aspect, a method for receiving a signal strength threshold in a ad-hoc wireless communications network is disclosed, the method comprising receiving messages from one or more other devices in the wireless communication network containing a dynamic signal strength threshold; determining the signal strength of the received messages; comparing the signal strength of the received messages and the signal strength threshold, to determine whether or not a wireless device may be a potential branch node; and transmitting the messages from one or more other devices, based at least in part on the determination of whether or not the wireless device may be a potential branch node.

In one aspect, a non-transitory, computer readable medium comprising instructions that when executed cause a processor in a device to perform a method for receiving a signal strength threshold in a ad-hoc wireless communications network is disclosed, the method comprising receiving messages from one or more other devices in the wireless communication network containing a dynamic signal strength threshold; determining the signal strength of the received messages; comparing the signal strength of the received messages and the signal strength threshold, to determine whether or not a wireless device may be a potential branch node; and transmitting the messages from one or more other devices, based at least in part on the determination of whether or not the wireless device may be a potential branch node.

DETAILED DESCRIPTION

Figure 1A:
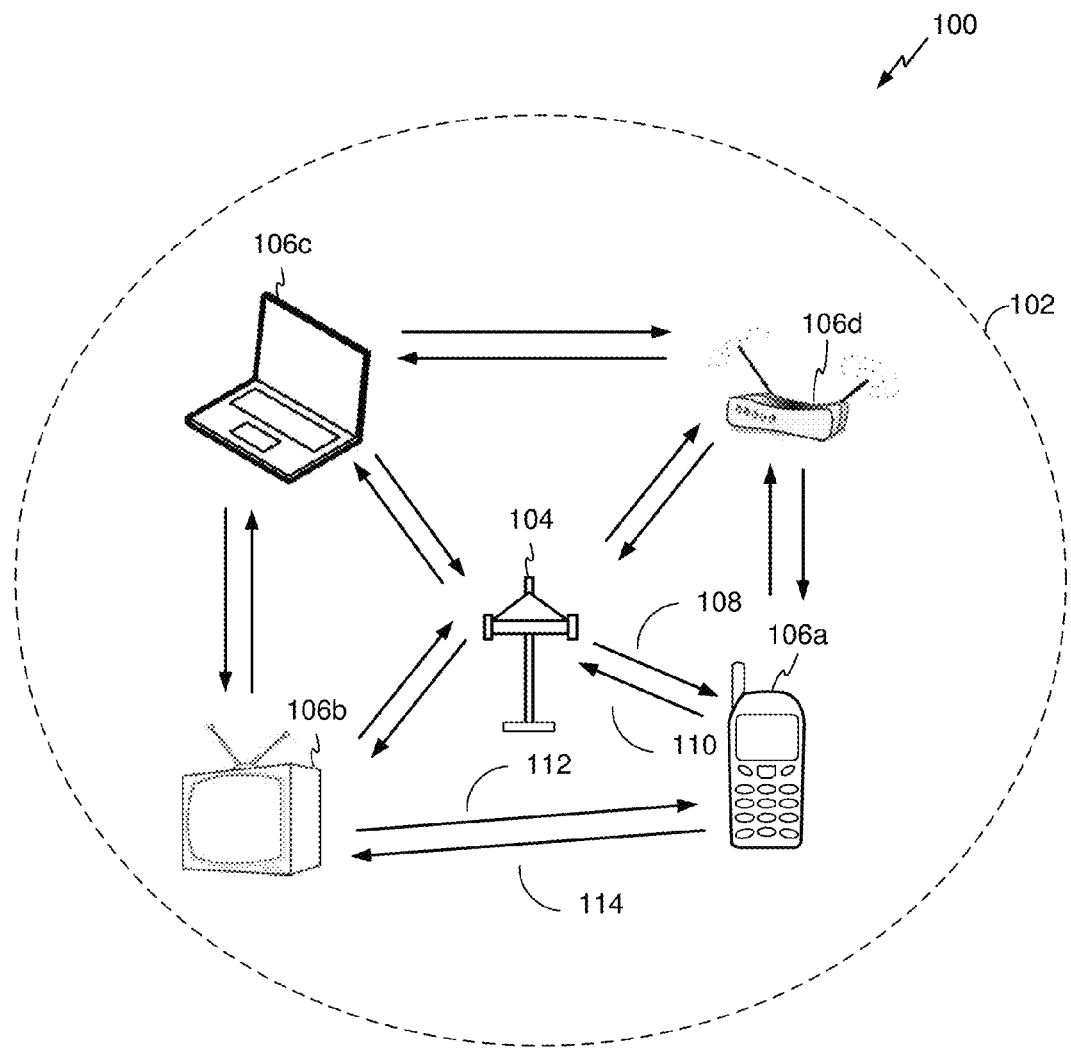
FIG. 1a illustrates an example of a prior art wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, a root node of a peer to peer network may transmit synchronization messages to coordinate one or more availability windows for communication between nodes of the peer to peer network. These synchronization messages may be transmitted on a fixed interval. For example, these synchronization messages may be transmitted once every 5, 10, 20, 50, or 100 availability windows. However, a fixed interval may be problematic as too short an interval may result in unnecessary network overheard, while too long an interval may result in synchronization error due to clock drift. Thus, it may be beneficial to optimize the intervals between synchronization messages in order to minimize synchronization errors while also minimizing unnecessary network overhead.

Figure 2:
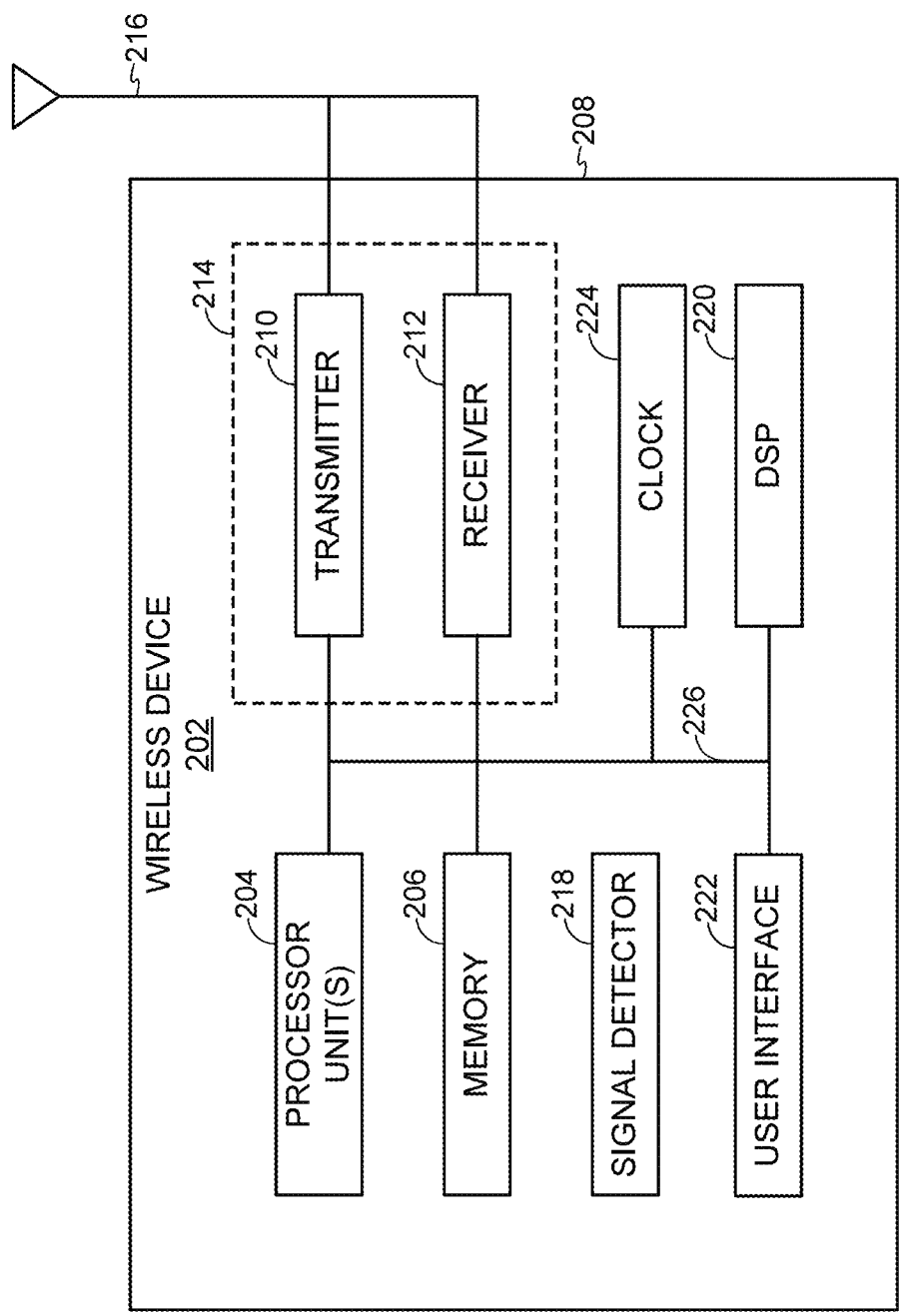
FIG. 2 illustrates a functional block diagram of a wireless device that may be employed within the wireless communication system of FIG. 1.

FIG. 2 illustrates various components that may be utilized in a wireless device 202 that may be employed within the wireless communication system 100 or 160. The wireless device 202 is an example of a device that may be configured to implement the various methods described herein. For example, the wireless device 202 may comprise the AP 104 or one of the STAs.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. In addition, the wireless device 202 may include a clock 224 configured to generate a clock signal that is used to coordinate and synchronize activities of the wireless device 202. In some configurations, the processor 204 may include the clock 224. The processor 204 may be configured to update the clock with a time value to allow for synchronization with other wireless devices.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 1B:
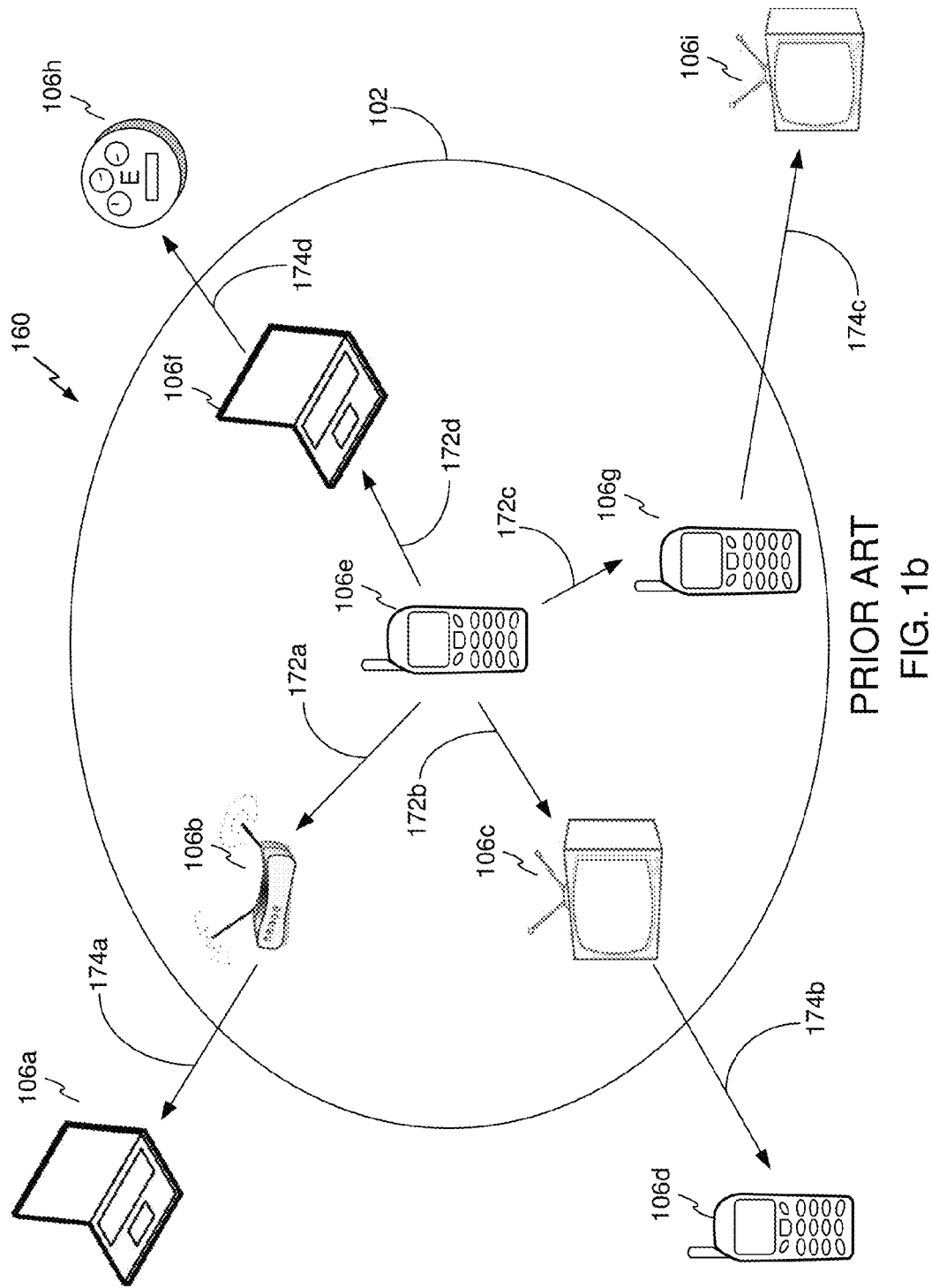
FIG. 1b illustrates another example of a prior art wireless communication system.

Devices, such as STAs, 106a-i shown in FIG. 1b, for example, may be used for neighborhood-aware networking, or social-WiFi networking. For example, various stations within the network may communicate on a device to device (e.g., peer-to-peer communications) basis with one another regarding applications that each of the stations supports. A discovery protocol may be used in a social-WiFi network to enable STAs to advertise themselves (e.g., by sending discovery packets) as well as discover services provided by other STAs (e.g., by sending paging or query packets), while ensuring secure communication and low power consumption.

In a neighborhood-aware or social-WiFi network, one device, such as wireless device 202, in the network may be designated as the root device or node. In some embodiments, the root device may be an ordinary device, like the other devices in the network, rather than a specialized device such as a router. In social-WiFi network, the root node may be responsible for periodically transmitting synchronization messages, or synchronization signals or frames, to other nodes in the network. The synchronization messages transmitted by root node may provide a timing reference for other nodes to coordinate an availability window during which communication occurs between the nodes. The synchronization message may also provide updates to a schedule for future availability windows. The synchronization messages may also function to notify STAs that they are still present in the peer to peer network. A social-WiFi network may also contain a number of branch synchronization nodes. These nodes may be responsible for re-transmitting synchronization messages they receive from the root node. This retransmission may allow the network to grow beyond the communication limits of the root node, and may extend the network and allow many more devices to communicate with each other. However, if too few nodes are selected as branch synchronization nodes, these benefits may be diminished of lost. Conversely, if too many nodes are selected as branch synchronization nodes, this may result in unnecessary network overhead.

Figure 3:
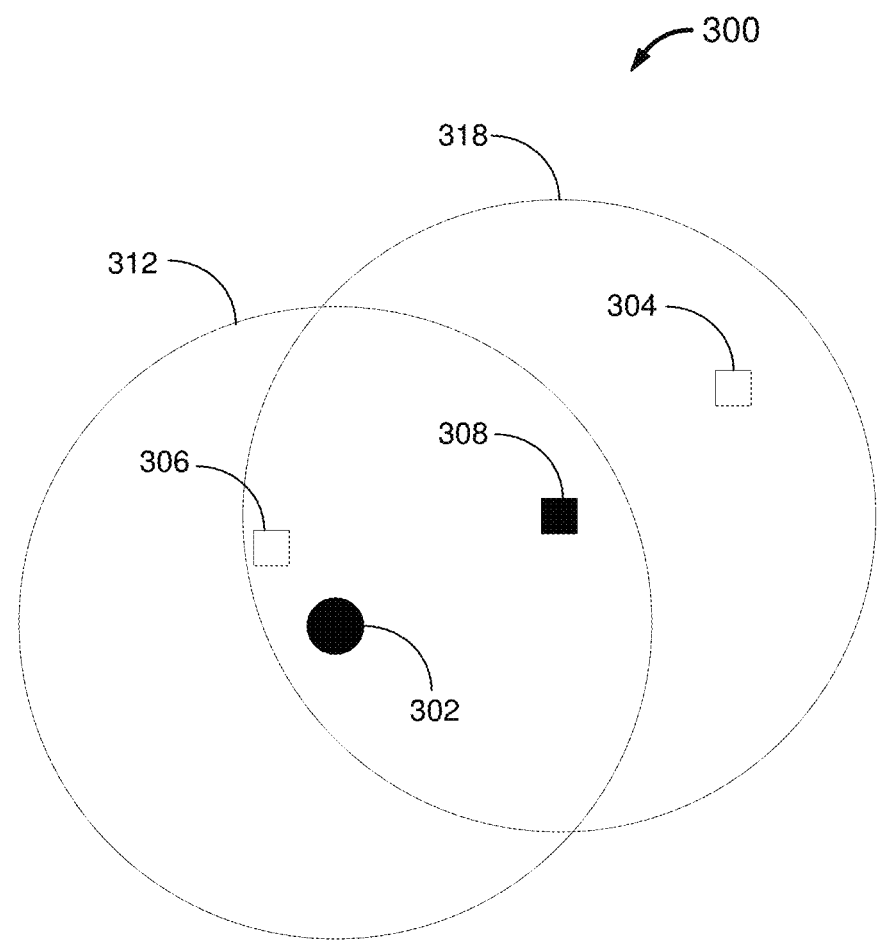
FIG. 3 is an illustration of a Social-WiFi network.

It may be beneficial to select one or more branch synchronization nodes which are some distance away from the root node. FIG. 3 is an illustration of a Social-WiFi network.

In FIG. 3, root node 302 is the root node of the Social-WiFi network 300. Root node 302 may be an ordinary wireless device, such as wireless device 202, and may have a wireless communication range 312. Beyond wireless communication range 312, other wireless devices may be unable to receive transmissions from the root node 302 and the root node 302 may be unable to receive wireless transmissions from those other devices. For example, wireless device 304 is outside the wireless communication range 312 of the root node 302. This means that wireless device 304 may be unable to receive the synchronization messages transmitted by the root node 302, unless a branch synchronization node is present.

In Social-WiFi network 300, two wireless devices 306 and 308 are within the communication range of the root node 302. These wireless devices 306 and 308 may be a part of Social-WiFi network 300. One or both of these wireless devices 306 and 308 may be chosen as a branch synchronization node. However, it may be beneficial to choose branch synchronization nodes which are further away from the root node 302, as these more distant devices may further extent the range of Social-WiFi network 300.

Many methods may be used to determine which wireless devices are further away from the root node 302. For example, a device may determine its received signal strength (RSSI) from the root node 302. This RSSI may provide an indication of how near the device is to the root node 302. This RSSI may be used, by either the root node 302 or a wireless device 308, to determine whether the wireless device 308 may be used as a branch synchronization node. In this example, wireless device 308 may have a wireless communication range 318. Wireless communication range 318 may include the position of wireless device 304, and therefore, wireless device 308 may be able to communicate with wireless device 304. Thus, if wireless device 308 is chosen as a branch synchronization node, wireless device 304 may be able to access Social-WiFi network 300.

Other metrics besides RSSI may also be used for this purpose. For example, in the case of devices with differing transmission power, path gain (PG) may be used instead of RSSI. For example, PG per packet may be computer as RSSI per packet minus the transmission power for a device. In some embodiments, a device may communicate its transmission power in its packets. A device may also communicate the type of device that it is, or other information which may allow another device to look up or calculate the transmission power of the transmitting device.

The selection of which wireless devices may be branch synchronization nodes may be based, at least in part, upon an RSSI threshold. This RSSI threshold may be used on one or both of the root node 302 and a wireless device 308. For example, wireless device 308 may contain an RSSI threshold. Wireless device 308 may compare the RSSI of a message from the root device with the RSSI threshold, and if the RSSI of a message from the root device is below the RSSI threshold, wireless device 308 may consider itself a candidate to be a branch synchronization node. Alternatively, root node 302 may transmit an RSSI threshold to wireless devices 306 and 308. This RSSI threshold may then be used by wireless devices 306 and 308 to determine whether these devices are eligible to become branch synchronization nodes.

However, if a fixed RSSI threshold is used for this purpose, this may cause undesirable problems. For example, if the fixed RSSI threshold is too low, there may be too few devices or no devices which receive signals from the root node 302 at an RSSI below the RSSI threshold. This may cause an insufficient number of wireless devices to be selected as branch synchronization nodes, and may thus unduly limit the physical range of the social-WiFi network 300. In the alternative, if the RSSI threshold is too high, there may be too many wireless devices to be selected as branch synchronization nodes. This may cause an unduly high amount of unnecessary network overhead. Therefore, it is desirable to use an optimized RSSI threshold for this purpose.

Figure 4:
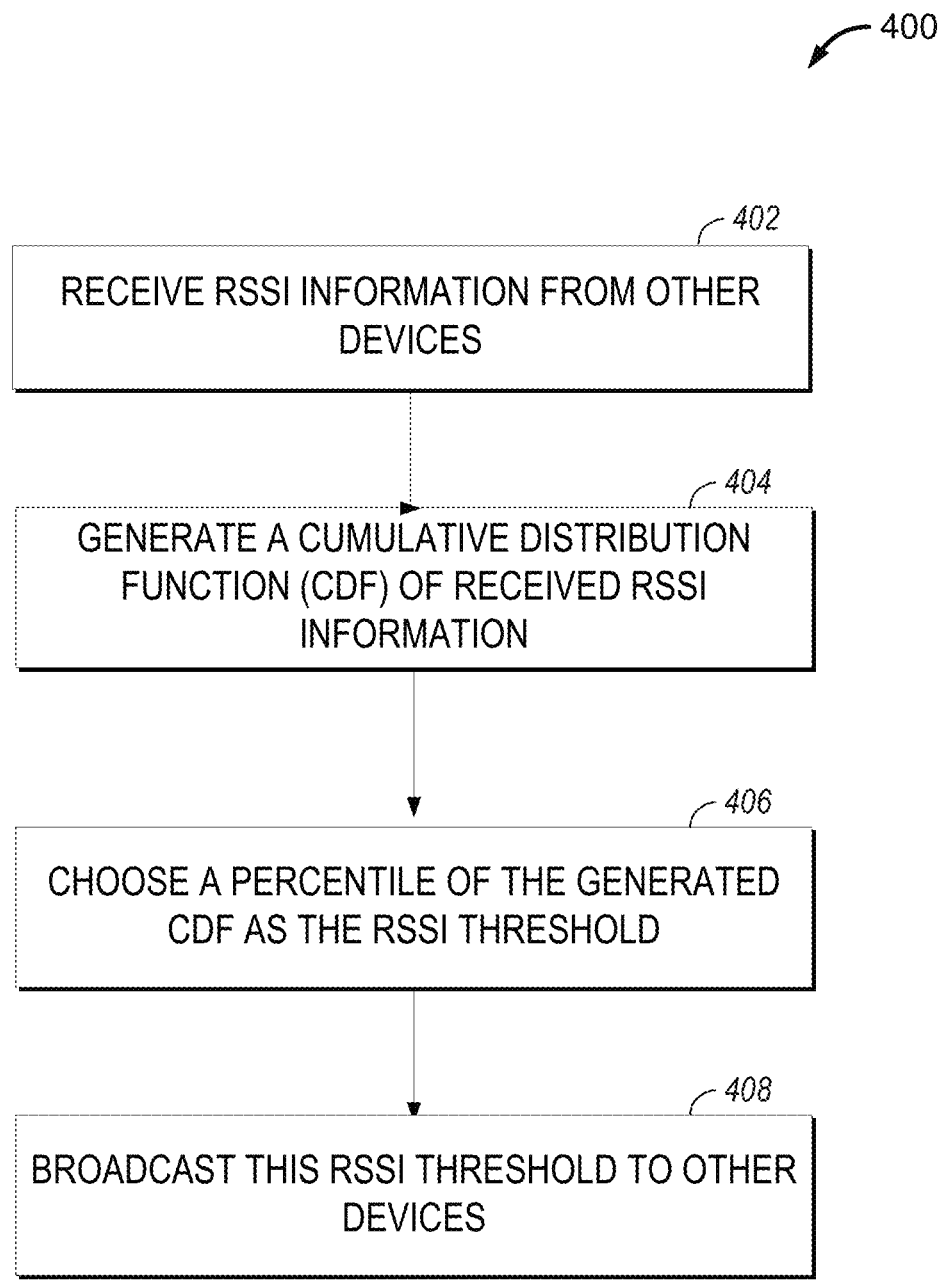
FIG. 4 is a flowchart of a method for calculating and communicating an optimal RSSI threshold on a social-WiFi network.

FIG. 4 is a flowchart of a method for calculating and communicating an optimal RSSI threshold on a social-WiFi network. This method may be done by a root device on a Social-WiFi network, such as root node 302 on social-WiFi network 300. In block 402, the root node receives RSSI information from other devices. For example, a root node may receive packets from a number of other devices in the Social-WiFi network. For each of these packets, the root node may calculate an RSSI. For each individual device that a root node receives packets from, the root node may calculate an average RSSI over a given time period.

Figure 5:
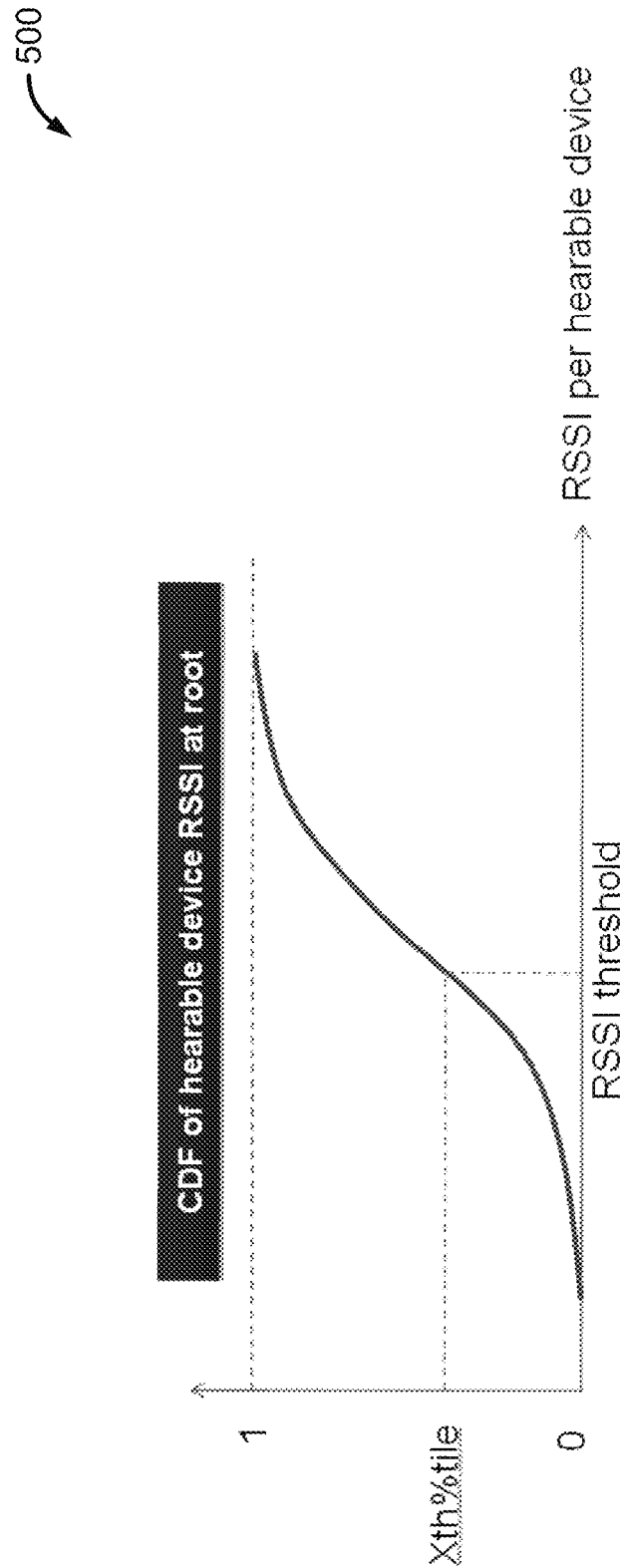
FIG. 5 is an example of a CDF that may be generated based upon received RSSI information.

In block 404, the root node generated a cumulative distribution function (CDF) of received RSSI information. This CDF may be generated using the received RSSI information directly, or may be generated based upon an average RSSI value for each wireless device that the root node receives packets from. FIG. 5 is an example of a CDF that may be generated based upon received RSSI information. In this example, the CDF is generated based upon the average RSSI of each device that the root device receives packets from.

In block 406, the root node chooses a percentile of the generated CDF as the RSSI threshold. For example, the root node may choose the 1st, 5th, 10th, 25th, or 50th percentile. Choosing a percentile of the generated CDF in this way may ensure that some number of wireless devices may be eligible to be branch synchronization nodes, unlike using a fixed RSSI threshold. The choice of which percentile to use may be based, at least in part, upon the number of wireless devices that a root device receives packets from. For example, if a root device receives packets from only a few devices during a given time period, it may be beneficial to choose a higher percentile than if a root device receives packets from many devices in the same period of time.

The generated CDF may be most useful in instances where the transmission power of wireless devices in the network is the same as the transmission power of the root device. This may ensure that the RSSI of the packets received at the root device is roughly the same as the RSSI of the packets received at the other devices. Thus, this root node would ensure that at least approximately the chosen percentile of devices would be eligible to become branch synchronization devices. However, if this assumption is not correct, other metrics aside from RSSI may be used, or may be used in conjunction with RSSI. For example, each device may include its transmission power in packets that it sends. This may allow the root device to calculate a path gain using the transmission power of a device combined with the received RSSI. In such an embodiment, this root node may be used with path gain for other devices on the network, rather than with RSSI.

In block 408, the root node may broadcast this RSSI threshold to other devices. This broadcast may allow other devices on the network to compare the RSSI of packets received from the root device to the RSSI threshold broadcast by the root device. These other devices may be eligible to become a branch synchronization node if their received RSSI from the root device is below the RSSI threshold. However, these devices may use other information as well in order to determine whether to become branch synchronization nodes. For example, a wireless device may compare the received RSSI strength and the RSSI threshold, but may also attempt to determine how many other branch synchronization nodes are near a particular wireless device. For example, if a wireless device is within range to receive packets from the root device and from multiple branch synchronization nodes, the wireless device may choose not to become a branch synchronization device.

In some embodiments, the root node may instead identify specific wireless devices to become branch synchronization nodes. The root node may identify wireless devices based on a signal strength indicator received from the wireless devices, such as a RSSI as described in FIG. 4. The root node may then transmit a message to a potential branch node, instructing the wireless device to become a branch node in a Social-WiFi network.

This algorithm may also be used on a branch synchronization node, rather than a root node. For example, in some Social-WiFi networks, there may be a series of branch synchronization nodes which are in communication with each other, but may not be in communication with the root node. There may also be a maximum number of "hops" that a synchronization message may take. For example, a synchronization message may be configured to "hop," or be re-transmitted, by three layers of branch synchronization nodes. Therefore, for the first and second layer of branch synchronization nodes, this algorithm may be used in order to determine which wireless devices may be used for a further level of branch synchronization nodes.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-5 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A device in an ad hoc wireless communication network configured to generate a signal strength threshold, the device comprising:
   a receiver configured to receive messages from other devices in the wireless communication network, the receiver being further configured to determine a number of other devices that sent messages;
   a processor configured to determine an average signal strength of the messages from the respective other devices and to identify the signal strength threshold to be used to determine a branch device, wherein the signal strength threshold is identified based, at least in part, on identifying the signal strength threshold that is larger than the average signal strength of the messages from a subset of the respective other devices, the processor being further configured to determine the subset of the respective other devices based on the number of other devices that sent messages, and wherein each of the respective other devices is eligible to be determined as the branch device if a signal strength associated with the respective other device is less than the signal strength threshold; and
   a transmitter configured to transmit the signal strength threshold to the other devices in the wireless communication network.

2. The device of claim 1, wherein the device is one of a root device and/or a branch synchronization device.

3. The device of claim 1, wherein the wireless communication network comprises a peer-to-peer wireless communication network.

4. The device of claim 1, wherein the wireless communication network comprises a Social-WiFi network.

5. The device of claim 1, wherein the processor is further configured to identify a potential branch device and wherein the transmitter is further configured to transmit instructions to the potential branch device that the device should become the branch device.

6. The device of claim 1, wherein the signal strength of the messages is a received signal strength indication (RSSI), and wherein the signal strength threshold is an RSSI threshold.

7. The device of claim 1, wherein the signal strength of the messages is a path gain, and wherein the signal strength threshold is a path gain threshold.

8. A method for determining a signal strength threshold in an ad-hoc wireless communications network, the method comprising:
   receiving messages from other devices in the wireless communication network;
   determining a number of other devices that sent messages;
   determining an average signal strength of the messages from the respective other devices in the wireless communication network, based at least in part on signal strengths of the respective other devices and the received messages from the other devices in the wireless communication network, wherein identifying the signal strength threshold comprises identifying the signal strength threshold that is larger than the average signal strength of the messages from a subset of the other devices in the wireless communication network;
   identifying the signal strength threshold to be used to determine a branch device;
   determining the subset of the respective other devices based on the number of other devices that sent messages, wherein each of the respective other devices is eligible to be determined as the branch device if a signal strength associated with the respective other device is less than the signal strength threshold; and
   transmitting the signal strength threshold to the other devices in the wireless communication network.

9. The method of claim 8, wherein the wireless communication network comprises a peer-to-peer wireless communication network.

10. The method of claim 8, wherein the wireless communication network comprises a Social-WiFi network.

11. The method of claim 8, further comprising identifying a potential branch device and transmitting instructions to the potential branch device that the device should become the branch device.

12. The method of claim 8, wherein the signal strengths of the respective other devices are received signal strength indications (RSSI), and wherein the signal strength threshold is an RSSI threshold.

13. The method of claim 8, wherein the signal strengths of the respective other devices are path gains, and wherein the signal strength threshold is a path gain threshold.

14. A non-transitory, computer readable medium comprising instructions that when executed cause a processor in a device to perform a method for determining a signal strength threshold in an ad-hoc wireless communications network, the method comprising:

receiving messages from other devices in the wireless communication network;

determining a number of other devices that sent messages;

determining an average signal strength of the messages from the respective other devices in the wireless communication network, based at least in part on signal strengths of the respective other devices and the received messages from the other devices in the wireless communication network, wherein identifying the signal strength threshold comprises identifying the signal strength threshold that is larger than the average signal strength of the messages from a subset of the other devices in the wireless communication network;

identifying the signal strength threshold to be used to determine a branch device;

determining the subset of the respective other devices based on the number of other devices that sent messages, wherein each of the respective other devices is eligible to be determined as the branch device if a signal strength associated with the respective other device is less than the signal strength threshold; and transmitting the signal strength threshold to the other devices in the wireless communication network.

15. The non-transitory, computer readable medium of claim 14, wherein the wireless communication network comprises a peer-to-peer wireless communication network.

16. The non-transitory, computer readable medium of claim 14, wherein the wireless communication network comprises a Social-WiFi network.

17. The non-transitory, computer readable medium of claim 14, wherein the method further comprises identifying a potential branch device and transmitting instructions to the potential branch device that the device should become the branch device.

18. The non-transitory, computer readable medium of claim 14, wherein the signal strengths of the respective other devices are received signal strength indications (RSSI), and wherein the signal strength threshold is an RSSI threshold.

19. The non-transitory, computer readable medium of claim 14, wherein the signal strengths of the respective other devices are path gains, and wherein the signal strength threshold is a path gain threshold.

20. A device in an ad hoc wireless communication network, the device comprising:

a receiver configured to receive messages from one or more other devices in the wireless communication network, the messages containing a signal strength threshold, wherein the signal strength threshold is identified based, at least in part, on identifying the signal strength threshold that is larger than an average signal strength of the received messages from a subset of the one or more other devices, the subset of the one or more other devices being based on a number of other devices that sent messages; and a processor configured to compare the signal strength threshold received in the messages to the average signal strength of the received messages, and further configured to determine whether the device may be a potential branch node based at least on the comparison of the signal strength threshold to the average signal strength of the received messages, wherein each of the one or more other devices is eligible to be determined as a potential branch node if a signal strength associated with the respective other device is less than the signal strength threshold.

21. The device of claim 20, wherein the processor is further configured to determine a presence of one or more branch nodes in the vicinity of the device.

22. A method in an ad-hoc wireless communications network, the method comprising:

receiving messages from one or more other devices in the wireless communication network, the messages containing a signal strength threshold, wherein the signal strength threshold is identified based, at least in part, on a signal strength threshold that is larger than an average signal strength of the received messages from a subset of the one or more other devices, the subset of the one or more other devices being based on a number of other devices that sent messages;

determining the average signal strength of the received messages;

comparing the average signal strength of the received messages to the signal strength threshold, to determine whether or not a wireless device may be a potential branch node, wherein the wireless device is eligible to be determined as a potential branch node if a signal strength associated with the wireless device is less than the signal strength threshold; and transmitting the messages from the one or more other devices, based at least in part on the determination of whether or not the wireless device may be the potential branch node.

23. The method of claim 22, further comprising determining a presence of one or more branch nodes in the vicinity of the wireless device.

24. A non-transitory, computer readable medium comprising instructions that when executed cause a processor in a device to perform a method in an ad-hoc wireless communications network, the method comprising:

receiving messages from one or more other devices in the wireless communication network, the messages containing a signal strength threshold, wherein the signal strength threshold is identified based, at least in part, on a signal strength threshold that is larger than an average signal strength of the received messages from a subset of the one or more other devices, the subset of the one or more other devices being based on a number of other devices that sent messages;

determining the average signal strength of the received messages;

comparing the average signal strength of the received messages to the signal strength threshold, to determine whether or not a wireless device may be a potential branch node, wherein the wireless device is eligible to be determined as a potential branch node if a signal strength associated with the wireless device is less than the signal strength threshold; and transmitting the messages from the one or more other devices, based at least in part on the determination of whether or not the wireless device may be the potential branch node.

25. The non-transitory, computer readable medium of claim 24, further comprising determining a presence of one or more branch nodes in the vicinity of the wireless device.

* * * * *